United States Patent
Yung et al.

(10) Patent No.: US 7,225,444 B1
(45) Date of Patent: May 29, 2007

(54) METHOD AND APPARATUS FOR PERFORMING PARALLEL DATA OPERATIONS

(75) Inventors: Alex P. Yung, Walnut, CA (US); Gregory Korenevsky, Manhattan Beach, CA (US); Steven Feinholz, Valencia, CA (US); Bruce W. Britton, Valencia, CA (US)

(73) Assignee: NCR Corp., Dayton, OH (US)

( * ) Notice: Subject to any disclaimer, the term of this patent is extended or adjusted under 35 U.S.C. 154(b) by 565 days.

(21) Appl. No.: 09/675,357

(22) Filed: Sep. 29, 2000

(51) Int. Cl.
*G06F 9/46* (2006.01)
*G06F 17/30* (2006.01)

(52) U.S. Cl. .................. 718/106; 718/100; 718/102; 718/104; 707/1; 707/3; 707/4

(58) Field of Classification Search .................... 707/1, 707/3, 4; 718/100, 102, 104, 106, 107
See application file for complete search history.

(56) References Cited

U.S. PATENT DOCUMENTS

| | | | | |
|---|---|---|---|---|
| 5,369,764 A | * | 11/1994 | Blair ............................... | 707/8 |
| 5,692,182 A | * | 11/1997 | Desai et al. .................... | 707/10 |
| 5,765,146 A | * | 6/1998 | Wolf et al. ..................... | 707/2 |
| 5,845,113 A | * | 12/1998 | Swami et al. .................. | 707/7 |
| 6,247,055 B1 | * | 6/2001 | Cotner et al. ................. | 709/227 |
| 6,256,621 B1 | * | 7/2001 | Tsuchida et al. ............... | 707/2 |
| 6,363,387 B1 | * | 3/2002 | Ponnekanti et al. ........... | 707/10 |

* cited by examiner

*Primary Examiner*—Meng-Al T. An
*Assistant Examiner*—William H. Wood
(74) *Attorney, Agent, or Firm*—Trop, Pruner & Hu

(57) ABSTRACT

A method and apparatus enables a client system to perform multi-phase parallel operations upon data in a database system. A data transaction request received by the client system. A plurality of multi-phase parallel tasks are executed in response to the request to perform the data operations upon the data in the database.

31 Claims, 9 Drawing Sheets

FIG. 6A

| Methods | Phase | Master | Slave (1) | Slave (2) |
|---|---|---|---|---|
| Startup | 1 | Allocate Global Var | Create/Connect an SQL session | Create/Connect an SQL session |
| | | Create/Connect an SQL session | NextPhase | NextPhase |
| | | NextPhase | | |
| | 2 | Create/Connect Fastload session(s) | Create/Connect Fastload session(s) | Create/Connect Fastload session(s) |
| | | NextPhase | EndMethod | EndMethod |
| | 3 | Issue 'Begin Loading' | | |
| | | EndMethod | | |
| Execute | 1 | Read a record from a data source | Read a record from a data source | Read a record from a data source |
| | | IF End-Of-Data NextPhase ELSE SamePhase | IF End-Of-Data NextPhase ELSE SamePhase | IF End-Of-Data NextPhase ELSE SamePhase |
| | 2 | Issue 'End Loading' (if specified by the user) | | |
| | | EndMethod | | |
| Checkpoint | 1 | Write statistics to Global Var | Write statistics to Global Var | Write statistics to Global Var |
| | | NextPhase | EndMethod | EndMethod |
| | 2 | Write checkpoint record(s) to the LOG | | |
| | | EndMethod | | |

FIG. 6B

| Methods | Phase | Master | Slave (1) | Slave (2) |
|---|---|---|---|---|
| Restart | 1 | Process checkpoint records | Process checkpoint records | Process checkpoint records |
| | | NextPhase | EndMethod | EndMethod |
| | 2 | Write a restart record to the LOG to indicate EndOfRestart | | |
| | | EndMethod | | |
| Terminate | 1 | Disconnect Fastload session(s) | Disconnect Fastload session(s) | Disconnect Fastload session(s) |
| | | NextPhase | NextPhase | NextPhase |
| | 2 | Disconnect SQL session | Disconnect SQL session | Disconnect SQL session |
| | | Deallocate Global Var | EndMethod | EndMethod |
| | | EndMethod | | |

METHOD AND APPARATUS FOR PERFORMING PARALLEL DATA OPERATIONS

TECHNICAL FIELD

The invention generally relates to storing, filtering, and accessing data in a parallel manner.

BACKGROUND

One of the key advantages of storing large amounts of data in a database is that a specific subset of the stored data can be retrieved in an organized manner. Often, the subset of the stored data that is retrieved is analyzed to study various indications, such as economic trends, consumer reactions, and the like. To learn about customers, businesses are collecting various types of information about their customers, such as personal data, geographic/demographic data, purchasing habits, and so forth. Such customer data are stored in a database system, such as in a relational database management system (RDBMS), where the data can be processed and sorted into a format suitable for reporting or analysis. An example of a database system in which such information is collected is a data warehouse in which data is input from a variety of sources and organized into a format that is structured for query and analysis or reporting. The volume of data collected in most large data warehouses is at least several gigabytes and often exceeds tens or even hundreds of terabytes.

To handle the massive amount of data that is collected and processed in such data warehouses, sophisticated platforms are typically employed. The platforms include parallel processing systems, such as massive parallel processing (MPP) systems or symmetric multiprocessing (SMP) systems. An MPP system typically is a multi-node system having a plurality of physical nodes interconnected by a network. An SMP system typically is a single-node system having multiple processors. Collected data is stored in storage devices in such systems, which are accessible by the various nodes or processors to perform processing. In a parallel system, stored data portions are accessible in parallel to increase access speeds.

Many times a user interfaces with a database system to implement several tasks. These tasks include storing data, retrieving data, performing data queries, and the like. In order to utilize computing resources efficiently, these tasks can be performed in parallel. The control of the tasks described above can be performed in the database, a database server system, or from a remote system such as a client system.

In conventional parallel processing environments, a typical application usually includes several tasks. Each of these tasks is generally responsible for a portion of an application's workload. Sometimes, an application can be parallelized based upon its functions; that is, each task can perform a different function. This process is called functional parallelism. Another way of parallelizing an application is to divide its input, output or intermediate data into multiple portions and to assign a task for each data portion. This method is often called data parallelism. In either case, each such task is usually independent of other tasks in the application in the sense that they do not need to share internal processing states or information with each other. Consequently, each task can be executed independently of other tasks, in a concurrent or simultaneous manner, the latter being the case in systems with multiple processors One of the difficulties frequently encountered in implementing a parallel application is the need to coordinate the processing of the individual parallel tasks. Currently, the most common approaches used to address this issue are broadcasting coordination requests from every task to all the other tasks and creating a central component that dictates and controls the processing and communication between the tasks. While the first approach is suitable for a certain class of parallel applications, it frequently leads to increased complexity in the design of the parallel application and also introduces increased communication overhead, which can impede the application's scalability.

The second approach is frequently used in transactional and database systems (e.g. the 2-phase commit protocol). It, too, restricts the flexibility in the design of the individual parallel tasks in the sense that the processing in each task is dictated by a statically defined protocol (such as a fixed number of steps or phases) implemented in a controller. This static protocol, which does not change from one application to another, lacks application-specific semantics that are usually required by complex applications such as ETL (Extract, Transform, Loading) applications used in a data warehousing environment.

Conventional parallel execution of data tasks employ synchronization functions; such as WAIT, POST, LOCK, UNLOCK, GROUP, BARRIER, and the like; which are generally platform-dependent. These platform-dependent synchronization functions require multiple implementations in order for applications to run in a heterogeneous environment. Multiple implementations of the synchronization functions are less efficient and require valuable computer resources.

SUMMARY

Described below is a technique for performing parallel data operations upon data in a database. This technique includes receiving a data transaction request in a client system and executing a plurality of multi-phase parallel tasks in response to the request to perform the data operations upon the data in the database.

In general, in accordance with one embodiment, an apparatus for performing parallel data operations upon data in a database, comprises: a user interface; a processor coupled with the user interface, wherein the processor receives a data transaction request from the user interface; and a controller coupled with the processor, wherein the controller performs a number of tasks in parallel based upon instructions received from the processor, each task performed in a plurality of phases.

Other features and embodiments will become apparent from the following description, from the drawings, and from the claims.

BRIEF DESCRIPTION OF THE DRAWINGS

The invention may be understood by reference to the following description taken in conjunction with the accompanying drawings, in which like reference numerals identify like elements, and in which:

FIGS. 6A and 6B illustrate one example of a master-slave implementation of the multi-phase protocol in accordance with one embodiment of the present invention;

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Generally, when data is transmitted from one device to another, such as from a server system to a client system, a certain amount of efficiency in performing data operations is desired. Embodiments of systems used to perform efficient parallel processing of data tasks between a client system and a database system are discussed below. The embodiments shown below illustrate a system that is capable of performing multi-phase synchronization of data tasks executed in parallel. The embodiments shown below illustrate a plurality of statically different synchronization points that are dictated by the central entity. Parallel implementation of data tasks are synchronized by the central entity in a multi-phase processing environment.

Figure 1:
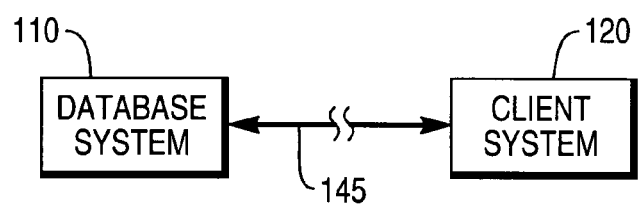
FIG. 1 is a block diagram of an example database communications system, including a database system and a client system, in accordance with an embodiment of the present invention.

FIG. 1 shows a system that comprises a database system 110 and a client system 120, in accordance with one arrangement of the present invention. The client system and the database system are connected together by a network connection 145. The client system 120 can be used to request a number of data-related operations in the database system 110. In the illustrated embodiment, the database system 110 receives data transaction requests from the client system 120. A data transaction request can be a request to store data, a request to retrieve data, a request to query data, a request to filter data, a request to erase data, and the like. The data transaction requests, which in one example are or Structured Query Language (SQL) queries, are executed by the database system 110. To communicate the SQL queries from the client system 120 to the database system 110, the SQL queries may be carried in requests according to a predetermined format. In one embodiment, the client system 120 performs a plurality of data tasks upon the database system 110 in parallel, via multiple paths, or sessions, to the database system 110. The network connection 145 supports a plurality of paths or sessions from the client system 120 to the database system 110.

In one embodiment, network connection 145 is typically either a private network connection or a public network connection, or a combination of both. Examples of the network connection 145 include communication networks, channels, links, or paths, and systems or devices (such as routers) used to route data over such networks, channels, links, or paths. A private network connection 145 typically includes local area networks (LANs) or wide area networks (WANs), while one example of a public network connection is the Internet. The types of devices or systems that have access to the communication networks include both wired and wireless devices or systems. Examples of wired devices include personal desktop computer systems that have access to the network connection 145 through dial-up services or other types of data network connection services. Wireless devices (e.g., portable computers with wireless modems, personal digital assistants, mobile telephones) have access to the network connection 145 over wireless infrastructures.

Figure 2:
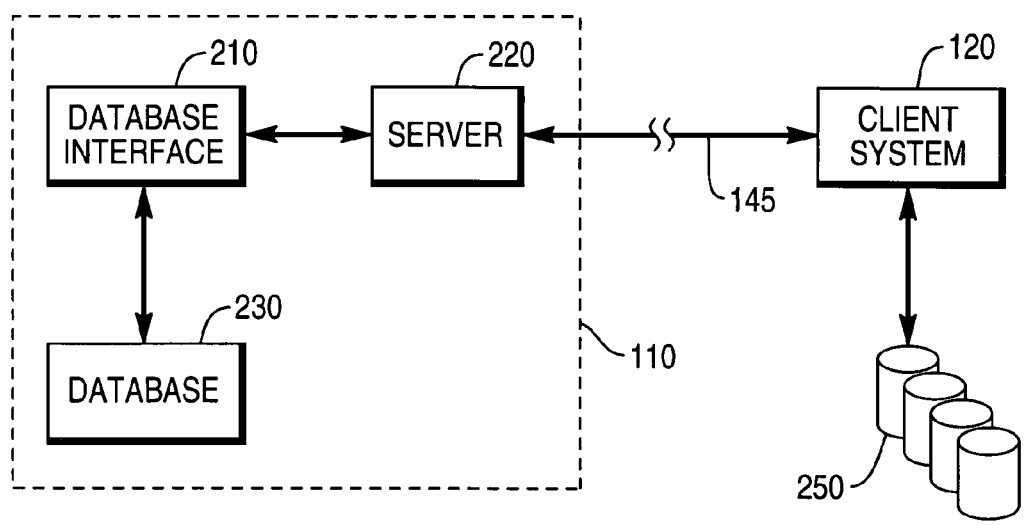
FIG. 2 is a more detailed depiction of one embodiment of the database system illustrated in FIG. 1.

Turning now to FIG. 2, a more detailed illustration of one embodiment of the database system 110, is shown. In one embodiment, the database interface 210 is capable of collecting requested or queried data from the database 230 in response to requests or queries from the client system 120. The database interface 210 is also capable of performing other data tasks, such as storing data into the database 230, retrieving data from the database 230, and the like. The database interface 210, along with the server 220, are capable of supporting multiple data operation tasks in a parallel manner. The system described in FIG. 1 is capable of facilitating data operations in a parallel manner, between the database system 110 and the client system 120.

In the illustrated embodiment, the server 220 receives data transaction requests from the client system 120. The requests are translated to a format that can be understood by the database controller 210, which in turn executes the tasks directed by the client system 120. In another arrangement, the client system 120 is coupled directly to the database interface 210 without going through the server 220. The client system 120 is capable of collecting data from a plurality of data sources 250 and storing them into the database system 110. The data source 250 can be a point-of-sale terminal in a retail environment, a hand-held terminal, a centrally-located computer system, a mainframe computer system, or the like. For example, the client system 120 gathers sales transaction data from a point-of-sale terminal in a retail environment and stores the data into the database system 110.

Figure 3:
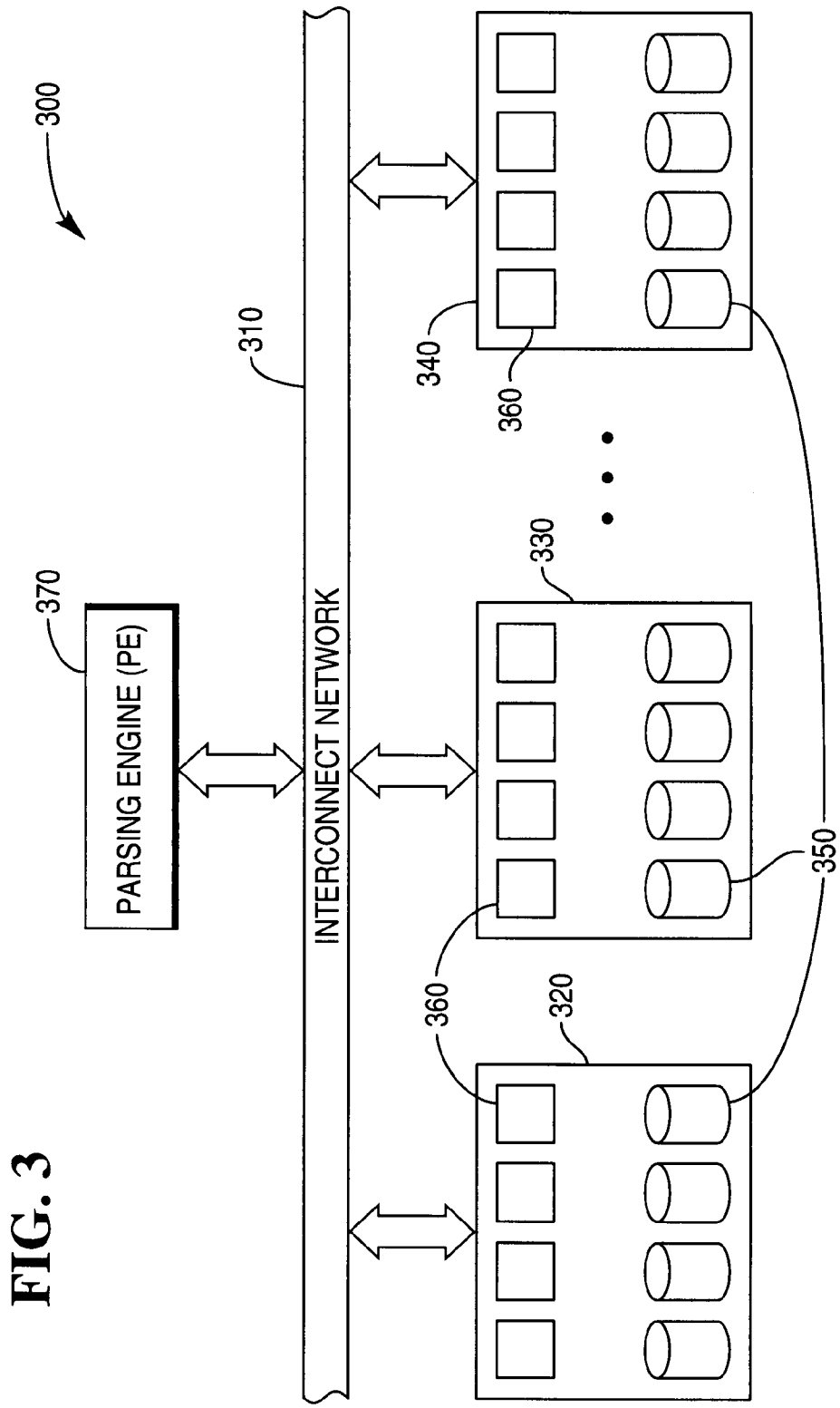
FIG. 3 is a block diagram of one embodiment of the database that can be used in the communication system of FIGS. 1 and 2.

Turning now to FIG. 3, one embodiment of a database unit 300 is illustrated. The illustrated database unit 300 in one example is made up of the database 230 and the database interface 210 (FIG. 2). In the illustrated embodiment, the database unit 300 is a multi-node parallel system that has a plurality of nodes 320, 330, 340 that are coupled by an interconnect network 310. The database unit 300 also comprises a parsing engine 370, which is capable of parsing data from the plurality of nodes 320, 330, 340. In another alternative embodiment, the database unit 300 comprises the database interface 210, the database 230, and the server 220. Each node 320, 330, 340 comprises one or more storage devices 350 and at least one memory storage controller 360. The arrangement of FIG. 3 is an example of a parallel database system. In further embodiments, other types of arrangements can be employed, such as single-node systems.

Figure 4:
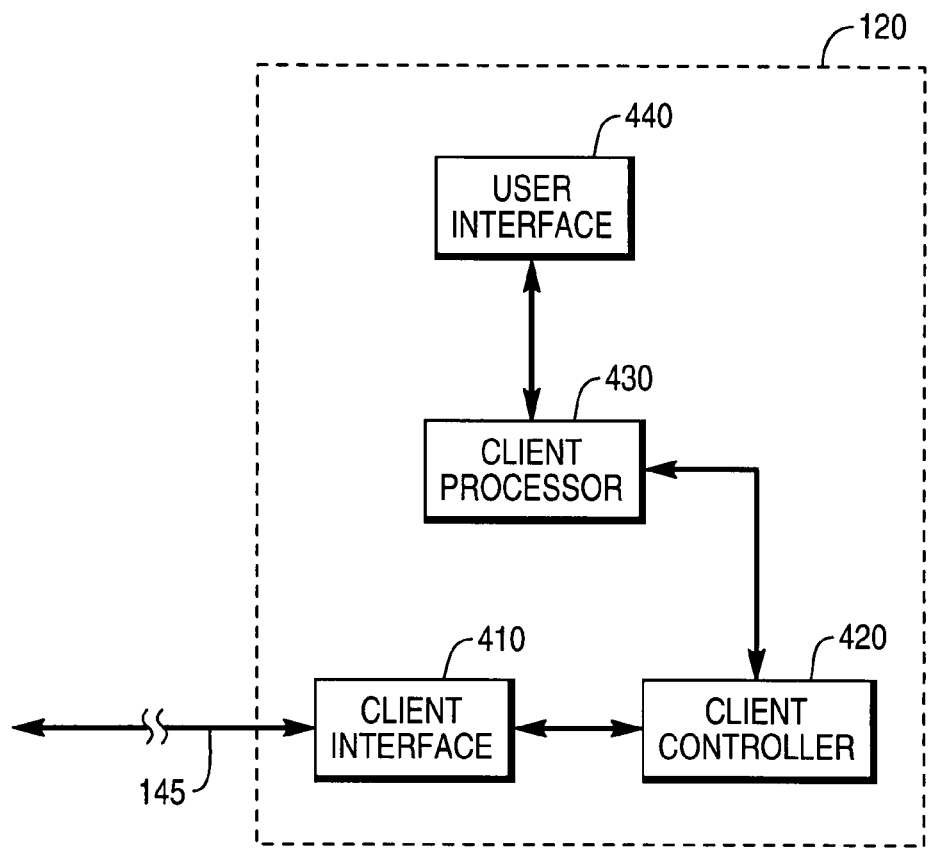
FIG. 4 is a block diagram of one embodiment of the client system illustrated in FIG. 1.

Turning now to FIG. 4, a more detailed illustration of one embodiment of the client system 120 is shown. The client system 120 comprises a client interface 410, a client controller 420, a client processor 430, and a user interface 440. The client interface 410 is coupled to the network connection 145 such that communications from the client system 120 and the database system 110 is enabled.

The client processor 430 receives data transaction requests and other instructions from the user interface 440. The client processor 430 then prompts the client controller 420 to execute the data transaction requests received from the user interface 440. Subsequently, the client controller 420 implements a multi-phase coordination protocol, in accordance with an embodiment, using the data transaction request.

Figure 5:
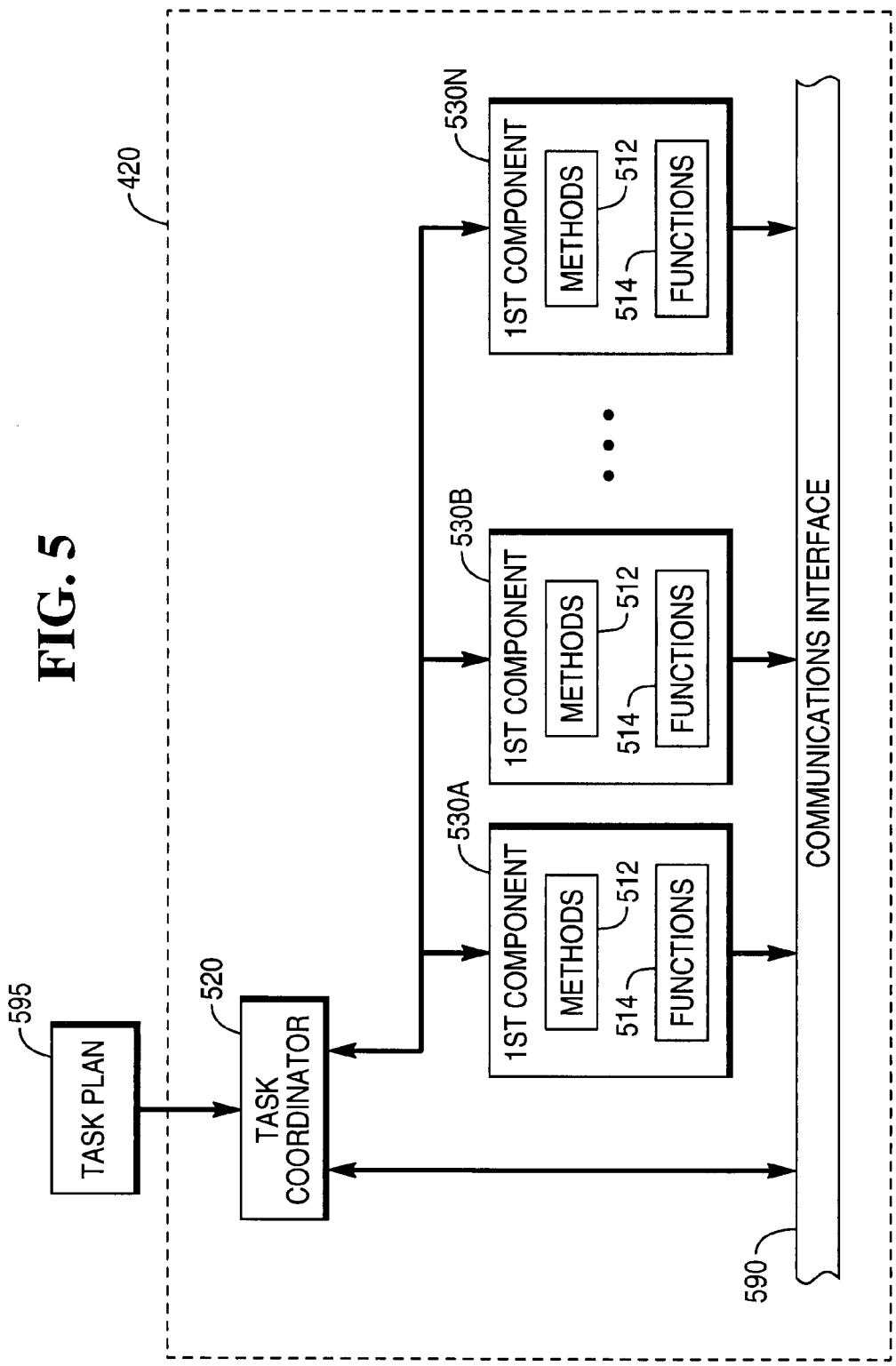
FIG. 5 is a block diagram of one embodiment of a client controller in the client system of FIG. 4.

FIG. 5 illustrates a more detailed description of one embodiment of the client controller 420. The client controller 420 comprises: a task coordinator 520; a first component 530A; a second component 530B; an Nth component 530N; and a communications interface 590. In one embodiment, the components 530 are software operators or processes that can perform data operations, such as data extract, data transform, data load, and other functions. The task coordinator 520 implements the request received by the client processor 430. The task coordinator 520 initiates the multi-phase coordination protocol, in accordance with the present invention, in order to perform parallel tasks called for by the client processor 430. In one embodiment, the components 530 use the methods 512 and functions 512 in order to perform the parallel tasks called for by the client processor 430. In one embodiment, the methods 512 and functions 514 are UNIX statements, SQL statements, or other types of methods or functions.

When the client processor 430 receives one or more data transaction requests from the user interface 440, the data transaction requests are analyzed by the client processor 430. In one embodiment, the client processor 430 then generates a task plan 595 in order to execute the request. In an alternative arrangement, the task plan 595 is generated by an external source (not shown). The task coordinator 520 selects one or more operators or components 530, which are used to perform the operation specified by the data transaction request. The operators or components 530 implement, or invoke, their tasks using the methods 512 or functions 514. Examples of the methods 512 used by the task coordinator 520 include a "Start-up" method, a "Terminate" method, an "Execute" method, a "Checkpoint" method, a "Restart" method, and the like.

The components 530 are able to communicate with each other over the communications interface 590. Data can be input into, or output from, the components 530 via the communications interface 590. When the task coordinator 520 receives a task plan 595, the task coordinator 520 defines a task that is executed by the components 530.

The tasks defined by the task coordinator 520 are then executed as steps that run in parallel with each other. In other words, a plurality of components 530 perform the tasks defined by the task coordinator 520 in a parallel manner. The task coordinator 520 implements the tasks using the components 530, the methods 512, and the functions 514.

The task coordinator 520 generates a multi-phase arrangement, wherein the tasks defined by the task coordinator 520 are performed within predetermined phases of the multi-phase arrangement. In one embodiment, a phase is a portion of a sequence in which one or more events called for by a task is performed. The task coordinator 520 synchronizes the tasks performed by the components 530. In one arrangement, the task coordinator 520 assigns the multi-phase structure such that each component 530 performs a task with a predetermined number or phase(s). For example, the first component 530A may perform a particular task in the first phase. Simultaneously, the second component 530B may perform another task independent of the first task. Therefore, the first and the second tasks are performed simultaneously and independently. In other words, the first and the second tasks are performed in a parallel manner. The second component 530B may require more than one phase to complete the task assigned to the second component 530B. Therefore, the task coordinator 520 will schedule a second phase in order to allow the second component 530B to complete its assigned task. The functions of the second component 530B can be performed independently and transparently to the functions of the first component 530A. Additionally, the first component 530A and the second component 530B may exchange data via the communications interface 590. The task coordinator 520 is capable of orchestrating multiple-tasks by invoking the components 530 in a plurality of phases.

In one embodiment, the first through Nth components 530 each are different instances of the methods 512. The methods 512 that can be invoked to create the components 530 include the "Startup" method, the "Execute" method, the "Checkpoint" method, the "Restart" method, and the "Terminate" method.

Referring now to FIGS. 6A and 6B, examples of generating the components that operate in a multi-phase parallel mode are illustrated. The example illustrates a Fastload operation, in which data is collected from one or more data sources and loaded into the database system 110. In this example, the Startup method (corresponding to the startup phase of the Fastload operation) is invoked three times to create three components 530 (or instances) that operate in parallel. In one embodiment in which a master-slave arrangement is used, the first component 530A is designated as the master component. The second and third components 530B, 530N can be designated as the slave components. The first component 530A example performs the Startup method in three phases. The second and third components 530B, 530N, which are the slave components, need only two phases to complete their respective tasks. The master component 530A and the slave components 530B, 530N operate in parallel. During the first phase, the master component 530A and the slave components 530B, 530N create connections for SQL sessions.

At the end of the first phase, the master and slave components 530 send a "NextPhase" message to the task coordinator 520. The "NextPhase" message indicates to the task coordinator 520 that the component 530 should be invoked in the next phase. The task coordinator 520 then invokes the components 530 that returned the "NextPhase" message for another phase. During the second phase, the master component 530A and the slave components 530B, 530N create a Fastload session. At the end of the second session, the slave components 530B, 530N send an "End-Method" message to the task coordinator 520, and the master component 530A sends a "NextPhase" message to the task coordinator 520. The "EndMethod" indicates to the task coordinator 520 that the method should not be used to invoke the component 530 that sent the "EndMethod" message. The task coordinator 520 then only invokes the master coordinator 530A for a third phase, wherein the "Begin Loading" command is issued to start the loading process, which includes retrieving data from data sources and loading the data into the database system 110. At the end of the third phase, the master component 530A issues an "EndMethod" to terminate the operation of the master component 530. This indicates to the task coordinator 520 that none of the components 530 need to be re-invoked.

An "Execute" method is used to load data from the client system 120 into the database system 110. Like the "Startup" method, the "Execute" method is carried out by three components, a master component 530A and two slave components 530B, 530C, operating in parallel. The master component 530A performs its assigned task in two phases, while the slave components 530B, 530N need only one phase to complete their respective tasks. In the first phase, the master component 530A and slave components 530B, 530N each read a record from a data source that is to be loaded into the database system 110, until it reaches an "end-of-data" indicator. Upon reaching the end-of-data point, each component 530 issues a NextPhase message to the to the task coordinator 520, which then invokes the respective component 530 for a second phase. If no end-of-data indicator is detected after reading a record, the component sends a "SamePhase" message to the task coordinator 520, which causes the task coordinator 520 to invoke the same components 530 within the same phase. In this example, only the master coordinator 530A is invoked in the second phase. In one embodiment, the master coordinator 530A issues an "End Loading" command to end the loading process and sends a "EndMethod" message to the task coordinator 520, which terminates the master component 530A.

To enable the components 530 to be executed in a checkpoint-restartable fashion (i.e., being able to re-enter a task-position and continue that task from the point it was previously halted), the "Checkpoint" method can be used to invoke a master component 530A and two slave components 530. The master and the slave components 530 operate in parallel. The components 530 write statistics to global variables, which provide indications of the current execution point of each component 530. If a fault were to occur for any reason, the global variables could be accessed to enable a restart from the last checkpoint. After the first phase, the master component 530A issues a "NextPhase" message to the task coordinator 520, while the slave components 530 issue "EndMethods" to the task coordinator 520. The task coordinator 520 invokes the master component 530A for another phase, while the task coordinator 520 terminates the slave components. The master component 530A writes checkpoint records to the log and issues an "EndMethod" message to the task coordinator 520, which then terminates the master component 530A. Similarly, other methods, such as the "Restart" and the "Terminate" methods, can be used to invoke components 530 for multi-phase parallel operation.

The previous examples illustrate the synchronization achieved by the implementation of the multi-phase operation in accordance with the present invention. In some cases the slave components 530B, 530N complete their respective tasks in two phases, while the master component 530A needs three phases to complete its task. Therefore, the slave components 530B, 530N are idle during an entire phase in which the corresponding master component 530A completes its respective task. The task coordinator 520 places the slave components 530B, 530N in a wait state during the phase in which the master component 530A completes its task (i.e. until the master component 530A sends back an "End-Method" message to the task coordinator 520). Therefore, the operations of the master component 530A and the slave components 530B, 530N are synchronized with the "End-Method" code.

In an alternative embodiment, the multi-phase protocol in accordance with the present invention can be implemented using components 530 that are not oriented in a master-slave format. In this embodiment, the components 530 control the phases and guide the task coordinator 520 to implement the multiple phase protocol using the multi-phase codes, such as NextPhase, SamePhase, and EndMethod. In this embodiment, the components 530 themselves can control whether they are to be invoked later by using the listed codes. A central control mechanism for parallel execution of tasks is thus not needed except for the task coordinator 520, which processes the codes to perform the requested invocation procedures.

Figure 7:
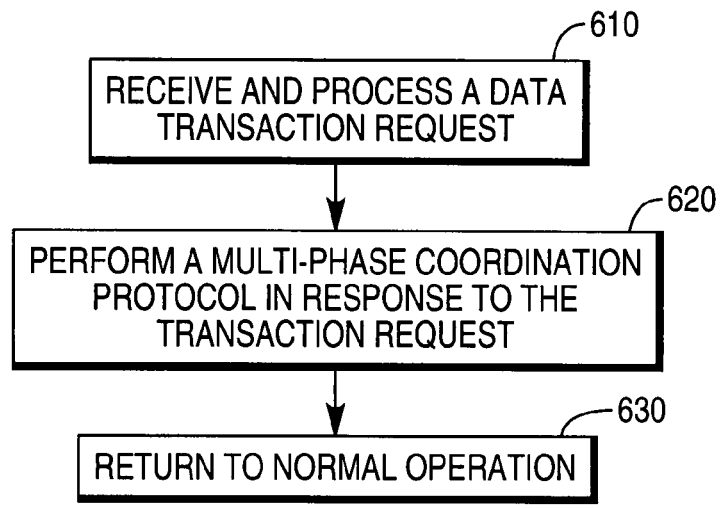
FIG. 7 is a flowchart of one embodiment of the method of performing parallel data operations.

FIG. 7 illustrates one embodiment of the method of performing parallel data operations in accordance with the present invention. The client system 120 receives a data transaction request from a user accessing the client system 120 (step 610). The client processor 430 receives through the user interface 440 and processes the data transaction request. The data transaction request may include data transactions such as data loading functions; data transformation functions, such as data selection, data validation, data cleansing and data condensing; data query functions; and the like. Once the client processor 430 receives the data transaction request, the client system 120 implements a multi-phase coordination protocol (step 620). A flow chart illustration of one embodiment of the steps in performing the multi-phase coordination protocol (step 620) is shown in FIG. 8.

Figure 8:
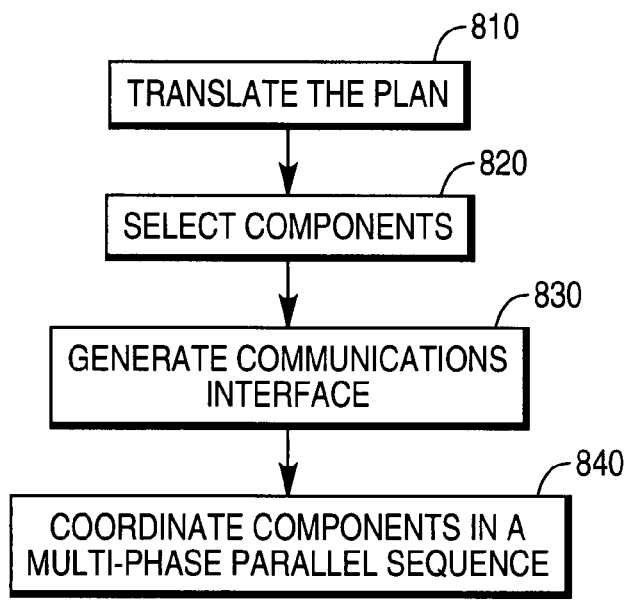
FIG. 8 is a flowchart of one embodiment of the method of preparing to perform a multi-phase coordination protocol.

FIG. 8 illustrates a flowchart depiction of one embodiment of the steps involved in preparing to perform the multi-phase coordination described above. The task coordinator 520 translates the task plan 595 (step 810 of FIG. 8). Translating the plan comprises translating the functions indicated in the job script initiated by the client processor 430. Subsequently, the task coordinator 520 selects one or more components 530, or operators, in order to perform the operations as defined by the plan 595 (step 820). In one embodiment, the components 530 are software components plugged into the client infrastructure. The components 530 are capable of providing data extraction operations, data transformation operations, and data loading functions. In one embodiment, the client system 120 defines the first component 530A as the master process or the controlling instance. The client system 120 defines subsequent components 530 as the slave components, or the worker tasks.

The launching of the task coordinator 520 also comprises the step of generating a communications interface 590 (step 830). The client system 120 generates the communications interface 590 in such a manner that each component 530 can receive an input or send an output to other components 530 via the communications interface 590. The task coordinator 520 then coordinates the operation of the components 530 in a multi-phase parallel sequence (step 840). In one embodiment, the task coordinator 520 orchestrates the operation of the component 530 within a plurality of phases. In each phase, one or more components 530 may perform operations simultaneously, or in parallel, within the phase.

Figure 9:
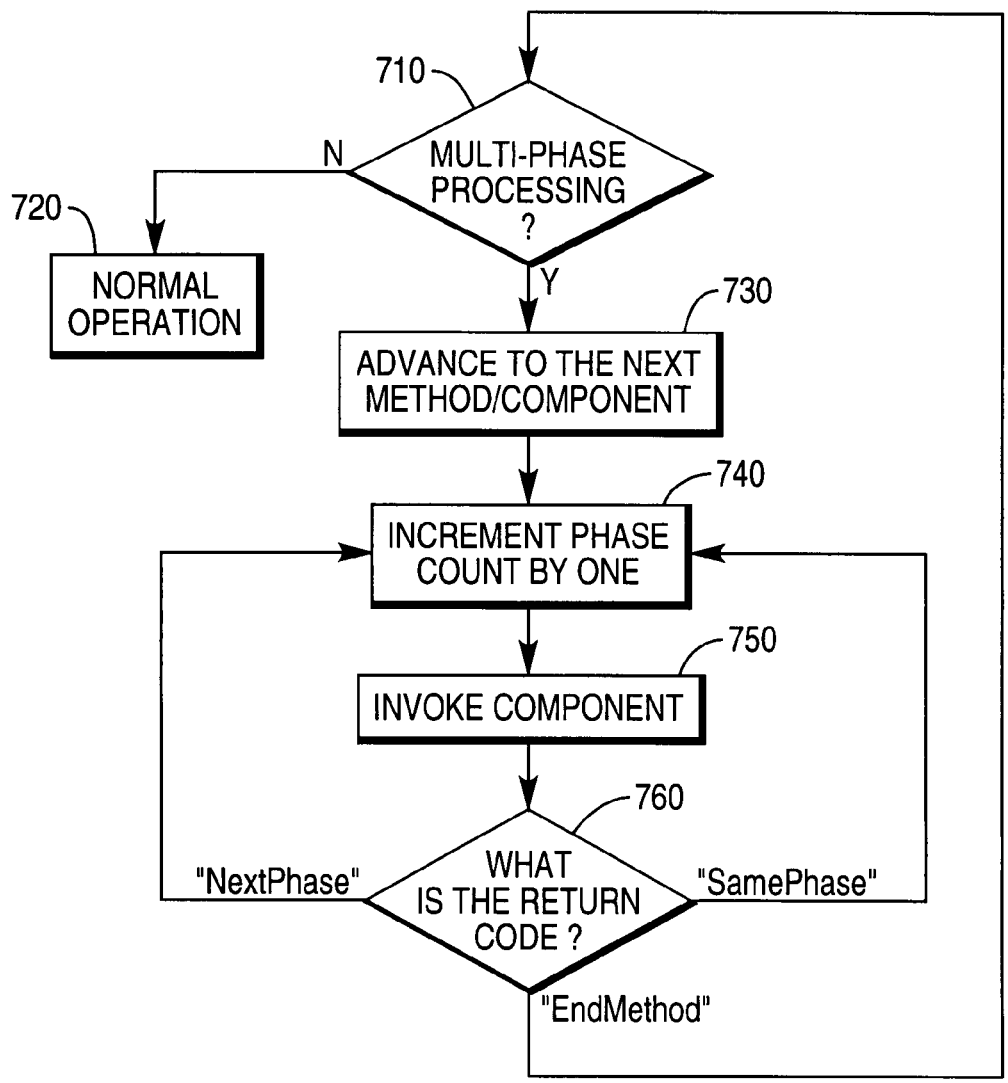
FIG. 9 is a flowchart of the method of performing the parallel data operations described in FIG. 7.

FIG. 9 illustrates a flowchart representation of the steps involved in performing the multi-phase coordination protocol (step 620 in FIG. 7) described above. The client controller 420 analyses the task plan 595 in order to determine whether a multi-phase processing is to be implemented (step 710). IN one embodiment, the task plan 595 comprises a job script generated by the client processor 430. When the client controller 420 makes a determination that multiphase processing is not to be implemented, the client system 120 enters a normal operation mode (step 720).

When the client controller 420 makes a determination that multiphase processing is to be implemented, the task coordinator 520 advances towards implementing the next component 530 by invoking the next method (step 730). In other words the task coordinator 520 invokes one or more components 530. The task coordinator 520 then increments a phase count by one (step 740). The task coordinator 520 invokes a component 530, by invoking a method, in the next phase, which corresponds to the incremented phase count (step 750).

The task coordinator 520 then analyzes the return code from the component 530 (step 760). When the component 530 returns a "SamePhase" message to the task coordinator 520, the task coordinator 520 again invokes the same component 530 within the same phase (see line 765). When the component 530 returns a "NextPhase" message to the task coordinator 520, the task coordinator 520 increments the phase count by one and invokes the same component 530 in the next phase (see line 770). When the component 530 returns an "EndMethod" message to the task coordinator 520, the client controller 420 determines if multi-phase processing is to be implemented, and the steps shown in FIG. 9 is repeated (see line 775). In an alternative embodiment, when the component 530 returns an "EndMethod" message to the task coordinator 520, the task coordinator 520 invokes the next component 530, and steps 730–760 are repeated.

Upon the completion of the steps described in FIG. 9, the step of performing the multi-phase coordination protocol upon the data transaction requests (step 620), is substantially complete. In one embodiment, the client system 120 performs the multi-phase coordination protocol described in FIGS. 6, 7, 8, and 9, upon the database system 110. Turning back to FIG. 7, once the transaction request is completed, the client system 120 is returned to normal operation (step 630).

Figure 10:
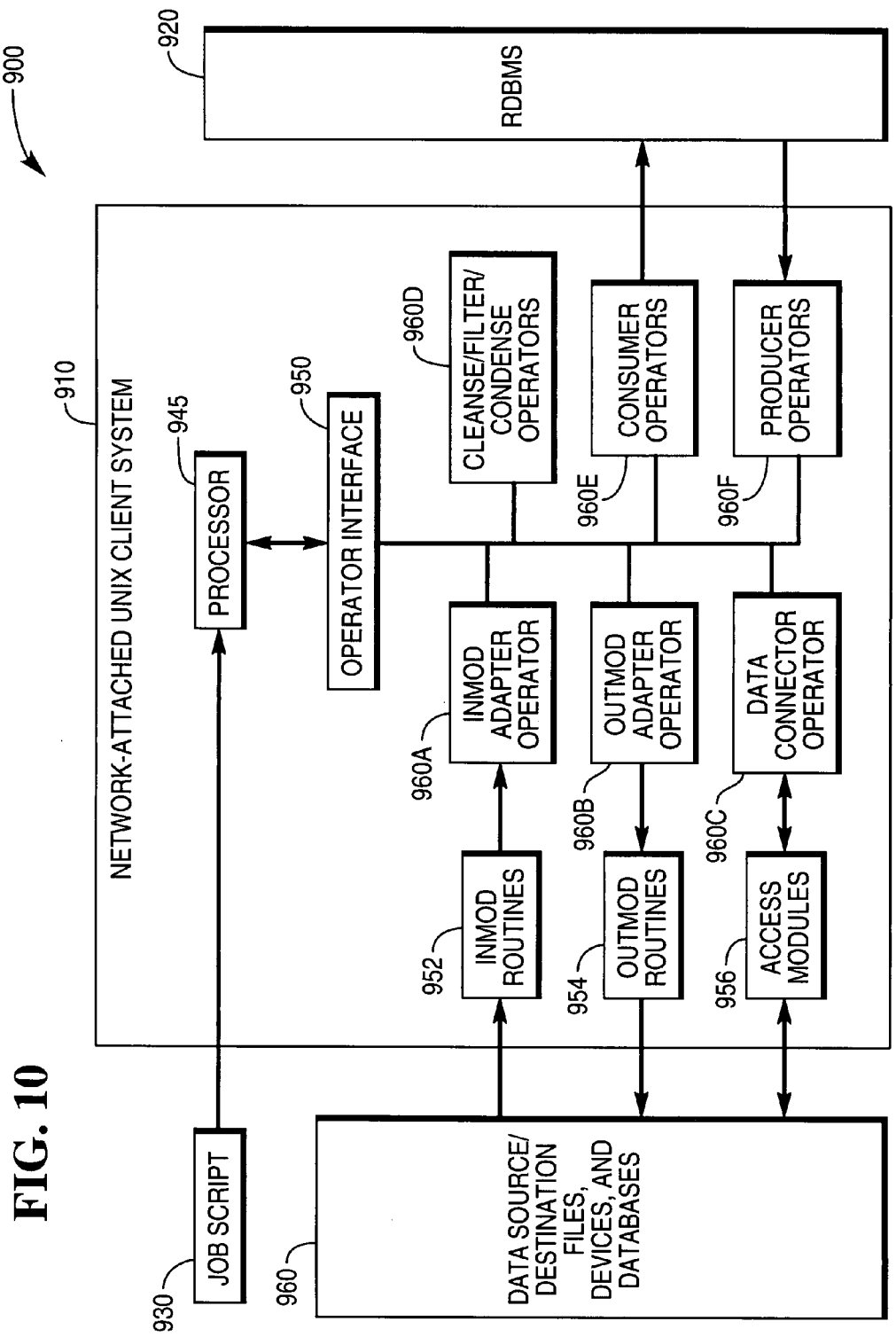
FIG. 10 is a block diagram of another database communications system, in accordance with another embodiment of the present invention.

FIG. 10 illustrates one embodiment of the implementation of the client system 120, in accordance with the present invention. The system 900 is capable of implementing the multi-phase protocol described above. The system 900 comprises a network-attached UNIX client system 910. The network-attached UNIX client system 910 comprises a processor 945 and an operator interface 950. The processor 945 is capable of parsing, compiling, and executing a series of statements submitted through the job script 930. The job script 930 is based upon the data transaction request received from a user. In one embodiment, the INMOD routines 952 and the OUTMOD routines 954 are software routines that interface with a data source to allow for data load and data export functions, respectively.

The UNIX client system 910 comprises a plurality of operators 960A–960E. In one embodiment, the operators 960 are software components of the system 900 that provide data functions such as data extract, data transform, and data load functions. In one embodiment, the system 900 performs multi-phase parallel data operations upon data in a database, such as the RDBMS, which is a parallel relational database. The producer operators 960E are capable of data extraction functions that include: getting data from the RDBMS 920; getting data from an external data source [not shown]; generate data internally; and pass data to other operators 960 via the operator interface 950. The consumer operators 960E are capable of data loading functions. The data loading functions performed by the consumer operator 960E include accepting data from other operators 960 via the operator interface 950 and loading the data into the RDBMS 920, or loading the data to an external data source. The cleanse/filter/condensed operators 960D are capable of performing data transformation functions. The data transformation functions that can be performed by the cleanse/filter/condense operators 960D include data selection, data validation, data cleansing, and data condensing.

In one embodiment, the operator interface 950 is a bi-directional call level interface that provides intercommunications between the processor 945 and the operators 960. The system 900 can load data and export data from any accessible database object in the RDBMS 920 or other data source that contains an access operator and an access module. The destination of the data for functions for operations performed by the system 900 can be a relational database, a non-relational database, a database server, file, or a data storage device. The data that is processed by the system 900 may be text or objects such as images, pictures, voice, or the like. Operations performed by the system 900 include retrieving, storing and transporting specific data objects via parallel data streams. The system 900 is also capable of performing merging or splitting multiple parallel data streams. Furthermore, the system 900 is capable of filtering, conditioning, and cleansing data.

The system 900 is capable of executing multiple instances of an operator. The system 900 has the ability to simultaneously read, transform, and load data. The parallel capabilities of the system 900 allows for data to be placed in a data buffer [not shown], while the next operator 960 can begin performing its tasks without waiting for the previous process to be completed. This capability allows for the elimination of intermediate storage devices since data is streamed through the processes performed by the system 900 without having the data written into storage disks.

The various devices and systems discussed each includes various software layers, routines, or modules. Such software layers, routines, or modules are executable on corresponding control units. The various control units in the devices or systems may each include a microprocessor, a microcontroller, a processor card (including one or more microprocessors or microcontrollers), or other control or computing devices. As used here, a "controller" refers to a hardware component, software component, or a combination of the two.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines, modules, or layers in the various devices or systems may be stored in respective storage devices. The instructions when executed by a respective control unit cause the corresponding device or system to perform programmed acts.

The instructions of the software routines, modules, or layers may be loaded or transported to each device or system in one of many different ways. For example, code segments including instructions stored on floppy disks, CD or DVD media, a hard disk, or transported through a network interface card, modem, or other interface device may be loaded into the device or system and executed as corresponding software routines, modules, or layers. In the loading or transport process, data signals that are embodied in carrier waves (transmitted over telephone lines, network lines, wireless links, cables, and the like) may communicate the code segments, including instructions, to the device or system. Such carrier waves may be in the form of electrical, optical, acoustical, electromagnetic, or other types of signals.

While the invention has been disclosed with respect to a limited number of =embodiments, those skilled in the art will appreciate numerous modifications and variations therefrom. It is intended that the appended claims cover all such modifications and variations as fall within the true spirit and scope of the invention.

What is claimed is:

1. A method of performing parallel data operations upon data in a database, comprising:
 receiving a data transaction request in a client system;
 executing each of a plurality of multi-phase parallel tasks in plural phases in response to the request to perform the data operations upon the data in the database; and
 each parallel task providing a code to indicate if the task is to be re-invoked in the next phase, wherein executing the plurality of multi-phase parallel tasks comprises:
executing at least first and second software components in parallel;
each of the first and second software components performing one or more operations in a first phase;
waiting for a message comprising the code from each of the first and second software components prior to proceeding to a second phase; and
each of the first and second software components performing one or more operations in the second phase.

2. The method of claim 1, wherein receiving a data transaction request comprises receiving a request for loading data into the database.

3. The method of claim 1, wherein receiving a data transaction request comprises receiving a request to perform a data transformation operation upon the data in the database.

4. The method of claim 3, wherein receiving a request to perform the data transformation operation comprises receiving a request to perform one of a data selection operation, a data validation operation, a data cleansing operation, and a data query operation.

5. The method of claim 1, wherein providing the code comprises providing the code to a task coordinator.

6. The method of claim 1, further comprising:
waiting for another message from each of the first and second software components prior to proceeding to a third phase;
the first software component performing one or more operations in the third phase; and
the second software component being idle in the third phase.

7. The method of claim 6, further comprising:
receiving a first message from the first software component indicating that the first software component is to be re-invoked in the third phase; and
receiving a second message from the second software component indicating that the second component is not to be re-invoked in the third phase.

8. The method of claim 1, wherein executing the plurality of multi-phase parallel tasks includes executing a plurality of checkpoint tasks in parallel, each checkpoint task having multiple phases, and each checkpoint task to write data to storage to provide an indication of a current execution point.

9. The method of claim 1, wherein executing the plurality of multi-phase parallel tasks includes executing the plurality of multi-phase tasks in parallel.

10. A method of performing parallel data operations upon data in a database, comprising:
receiving a data transaction request in a client system;
executing a plurality of multi-phase parallel tasks in response to the request to perform the data operations upon the data in the database;
analyzing the transaction request;
creating a task plan in response to the transaction request;
implementing the task plan in a multi-phase organization, wherein the plurality of multi-phase parallel tasks are executed to implement the task plan;
determining, by a task coordinator, whether an additional phase is required to execute the tasks based on codes returned by the tasks to the task coordinator; and
scheduling, by the task coordinator, an additional phase in response to the determination that an additional phase is required;
re-invoking, by the task coordinator, a first one of the parallel tasks in the additional phase in response to the first parallel task providing a first code indicating the first parallel task is to be re-invoked,
wherein the task coordinator does not re-invoke a second one of the parallel tasks in the additional phase in response to the second parallel task providing a second code indicating the second parallel task is not to be re-invoked.

11. The method of claim 10, wherein implementing the task plan comprises creating a job script.

12. The method of claim 10, wherein implementing the task plan comprises:
translating the task plan;
selecting a plurality of software components corresponding to the parallel tasks to implement the translated task plan;
assigning a plurality of processes corresponding to the software components; and
creating a communications channel to allow for communications between the processes.

13. The method of claim 12, wherein selecting the plurality of software components to implement the translated task plan comprises selecting the plurality of software components to perform at least one of a data extraction operation, a data transformation operation, and a data loading operation.

14. An apparatus, comprising:
a user interface;
a processor coupled with the user interface, wherein the processor receives a data transaction request from the user interface; and
a controller coupled with the processor, wherein the controller performs a plurality of tasks in parallel based upon instructions received from the processor, each task performed in a plurality of phases,
each task to provide a code to indicate whether the task is to be re-invoked in a next phase,
wherein the controller comprises at least first and second software components executable in parallel to perform the plurality of tasks;
wherein each of the first and second software components is executable to perform one or more operations in a first phase,
the controller to wait for a message comprising the code from each of the first and second software components prior to proceeding to a second phase; and
wherein each of the first and second software components is executable to perform one or more operations in the second phase.

15. The apparatus of claim 14, wherein the processor generates a task plan in response to the data transaction request.

16. The apparatus of claim 15, wherein the controller comprises a task coordinator to execute the task plan.

17. The apparatus of claim 16, the task coordinator to:
re-invoke a first one of the plurality of tasks in response to the first task providing a first code to the task coordinator; and
not re-invoke a second one of the plurality of tasks in response to the second task providing a second code to the task coordinator.

18. The apparatus of claim 15, wherein the controller further comprises a plurality of components to implement the task plan in parallel.

19. The apparatus of claim 14, wherein the controller performs a number of tasks in parallel based upon instructions received from the processor, each task performed in a plurality of phases further comprises the controller performing the tasks in a sequence of multiple process steps.

20. The apparatus of claim 14, wherein the controller is adapted to further wait for another message from each of the first and second software components prior to proceeding to a third phase;

wherein the first software component is executable to perform one or more operations in the third phase, and the second software component is idle in the third phase.

21. The apparatus of claim 20, wherein the controller is adapted to further:

receive a first message from the first software component indicating that the first software component is to be re-invoked in the third phase; and receive a second message from the second software component indicating that the second component is not to be re-invoked in the third phase.

22. The apparatus of claim 14, wherein the plurality of tasks include a plurality of checkpoint tasks that are executed in parallel, each checkpoint task having multiple phases, and each checkpoint task to write data to storage to provide an indication of a current execution point.

23. A system, comprising:

a database system;

a network; and a client system separate from the database system and coupled to the database system over the network, the client system to establish plural sessions with the database system, wherein the client system is adapted to execute plural tasks in parallel, each of the plural tasks executable in plural phases, and each task to provide a code to indicate whether the task is to be re-invoked in a next phase, the client system comprising a task coordinator, the task coordinator to:

re-invoke a first one of the plurality of tasks in response to the first task providing a first code to the task coordinator; and not re-invoke a second one of the plurality of tasks in response to the second task providing a second code to the task coordinator.

24. The system of claim 23, wherein the database system is a parallel database system.

25. The system of claim 23, wherein the client system comprises:

a processor to receive a data transaction request;

a plurality of operators to perform parallel data operations in response to the data transaction request;

an operator interface coupled to the operators, wherein the operator interface allows communications between the operators.

26. An article comprising at least one storage medium containing instructions that when executed cause a client system to:

receive a data transaction request;

establish plural sessions with a database system over the network connection in response to the request; and execute a plurality of parallel tasks in the plural sessions to perform data operations upon the data in the database system over a network connection, wherein the client system is separate from the database system, wherein each of the parallel tasks is executed in plural phases, and wherein executing the parallel tasks in plural phases comprises:

executing at least first and second software components in parallel;

each of the first and second software components performing one or more operations in a first phase;

waiting for a message from each of the first and second software components prior to proceeding to a second phase; and each of the first and second software components performing one or more operations in the second phase.

27. The article of claim 26, wherein the instructions when executed cause the client system to execute a first parallel task in a first number of phases and a second parallel task in a second, different number of phases.

28. The article of claim 26, wherein the instructions when executed cause the client system to further:

wait for another message from each of the first and second software components prior to proceeding to a third phase;

cause the first software component to perform one or more operations in the third phase; and cause the second software component to be idle in the third phase.

29. The article of claim 28, wherein the instructions when executed cause the client system to further:

receive a first message from the first software component indicating that the first software component is to be re-invoked in the third phase; and receive a second message from the second software component indicating that the second component is not to be re-invoked in the third phase.

30. A method of performing parallel data operations upon data in a database, comprising:

receiving a data transaction request in a client system;

executing a plurality of multi-phase parallel tasks in response to the request to perform the data operations upon the data in the database, wherein executing the multi-phase parallel tasks comprises executing each of the parallel tasks in plural phases; and each parallel task providing a code to a task coordinator to indicate if the task is to be re-invoked in the next phase;

re-invoking, by the task coordinator, a first one of the parallel tasks in the next phase in response to the first parallel task providing a first code indicating the first parallel task is to be re-invoked, wherein the task coordinator does not re-invoke a second one of the parallel tasks in the next phase in response to the second parallel task providing a second code indicating the second parallel task is not to be re-invoked.

31. The method of claim 30, wherein executing the plurality of multi-phase parallel tasks comprises executing first and second software components, the first parallel task comprising the first software component, and the second parallel task comprising the second software component, wherein re-invoking the first parallel task comprises re-invoking the first software component.

* * * * *